(12) United States Patent
Smith et al.

(10) Patent No.: US 8,490,318 B2
(45) Date of Patent: Jul. 23, 2013

(54) COLLAPSIBLE LANDING NET

(75) Inventors: Ross O. Smith, Oxford, MI (US); Jeff A. Kempf, Sterling Heights, MI (US)

(73) Assignee: Leverage Landing Net, LLC., Oxford, MI (US)

( * ) Notice: Subject to any disclaimer, the term of this patent is extended or adjusted under 35 U.S.C. 154(b) by 268 days.

(21) Appl. No.: 13/014,696

(22) Filed: Jan. 26, 2011

(65) Prior Publication Data

US 2012/0186133 A1     Jul. 26, 2012

(51) Int. Cl.
*A01K 77/00*     (2006.01)

(52) U.S. Cl.
USPC .................................... 43/12; 43/11

(58) Field of Classification Search
USPC ...................................... 43/7, 11, 12
See application file for complete search history.

(56) References Cited

U.S. PATENT DOCUMENTS

| | | | | |
|---|---|---|---|---|
| 325,287 A * | 9/1885 | Utley | | 43/12 |
| 1,391,841 A * | 9/1921 | Lewis | | 43/12 |
| 1,668,835 A * | 5/1928 | Allen | | 43/12 |
| 1,726,715 A * | 9/1929 | Powell | | 43/12 |
| 1,835,197 A * | 12/1931 | Young | | 43/12 |
| 1,894,192 A * | 1/1933 | Olson | | 43/12 |
| 2,066,439 A * | 1/1937 | Wine et al. | | 43/12 |
| 2,205,229 A * | 6/1940 | Spriggs et al. | | 43/12 |
| 2,515,685 A * | 7/1950 | Ash | | 43/12 |
| 2,590,249 A * | 3/1952 | Horgard | | 43/12 |
| 2,637,133 A * | 5/1953 | Ross | | 43/12 |
| 2,683,321 A * | 7/1954 | Faber | | 43/12 |
| 2,739,403 A * | 3/1956 | Kalmus | | 43/12 |
| 2,984,038 A * | 5/1961 | Chapralis | | 43/12 |
| 3,032,908 A * | 5/1962 | Cohen et al. | | 43/12 |
| 3,670,444 A * | 6/1972 | Dieterich | | 43/12 |
| 4,050,177 A * | 9/1977 | Gerritsen | | 43/12 |
| 4,492,052 A * | 1/1985 | Davis | | 43/12 |
| 4,822,087 A * | 4/1989 | DeCarlo | | 43/11 |
| 4,870,773 A * | 10/1989 | Schmucker et al. | | 43/12 |
| 5,131,178 A * | 7/1992 | Stoliar et al. | | 43/12 |
| 5,380,113 A * | 1/1995 | Boehm | | 43/12 |
| 5,471,778 A * | 12/1995 | Marfori | | 43/12 |
| 5,479,739 A * | 1/1996 | Livingston | | 43/12 |
| 5,581,929 A * | 12/1996 | Molloy | | 43/12 |
| 6,058,642 A * | 5/2000 | Branneman | | 43/12 |
| 6,178,684 B1 * | 1/2001 | Nyakas et al. | | 43/12 |
| 6,454,233 B1 * | 9/2002 | Adams | | 43/12 |
| 8,261,482 B1 * | 9/2012 | Buchanan | | 43/12 |
| 2004/0217246 A1 * | 11/2004 | Adams | | 43/12 |
| 2009/0255166 A1 * | 10/2009 | Lu | | 43/12 |

FOREIGN PATENT DOCUMENTS

| | | | |
|---|---|---|---|
| FR | 2700443 A1 * | 7/1994 | |
| GB | 2290013 A * | 12/1995 | |
| GB | 2343098 A * | 5/2000 | |
| JP | 08116827 A * | 5/1996 | |

(Continued)

*Primary Examiner* — Darren W Ark
(74) *Attorney, Agent, or Firm* — Richard C. Litman (57) ABSTRACT

The collapsible landing net includes a substantially elongate pole having an arm stabilizer at one end and a main hinge disposed on the opposite end. An intermediate hand grip portion defines a handle with a grip thereon. A collapsible net assembly is operatively attached to a pivot block on the main hinge to selectively fold the collapsible landing net. The collapsible net assembly includes a pair of curvilinear net rims threaded through a hook free net. The net rims are pivotal about a common point at one end of each net rim, while the other end is connected to the pivot block. The collapsible net assembly may be collapsed by selectively rotating the net rims into a folded position and locked.

5 Claims, 7 Drawing Sheets

FOREIGN PATENT DOCUMENTS

| | | | | |
|---|---|---|---|---|
| JP | 08322432 A | * | 12/1996 |
| JP | 09009822 A | * | 1/1997 |
| JP | 11137123 A | * | 5/1999 |
| JP | 2000270715 A | * | 10/2000 |
| JP | 2001299145 A | * | 10/2001 |
| JP | 2002142612 A | * | 5/2002 |
| JP | 2003304779 A | * | 10/2003 |
| JP | 2004033060 A | * | 2/2004 |
| JP | 2004049191 A | * | 2/2004 |
| JP | 2005110585 A | * | 4/2005 |
| JP | 2005323507 A | * | 11/2005 |
| JP | 2006115819 A | * | 5/2006 |
| JP | 2007028952 A | * | 2/2007 |
| JP | 2007061043 A | * | 3/2007 |
| JP | 2007319011 A | * | 12/2007 |
| JP | 2009232698 A | * | 10/2009 |
| JP | 2011041492 A | * | 3/2011 |
| WO | WO 9407362 A1 | * | 4/1994 |

* cited by examiner

COLLAPSIBLE LANDING NET

CROSS-REFERENCE TO RELATED APPLICATION

This application claims the benefit of U.S. Provisional Patent Application Ser. No. 61/282,246, filed Jan. 27, 2010.

BACKGROUND OF THE INVENTION

1. Field of the Invention

The present invention relates to fishing accessories and more particularly to a collapsible landing net for convenient one-handed operation to net animals and objects and for ease of storage.

2. Description of the Related Art

Besides the atmosphere, one of the most rewarding aspects of fishing is derived from catching that fish. Once hooked, it turns into a game of tug of war between the fisherman and fish where strength is not the most determinative factor. Pull too hard and the fishing line and/or pole may snap. Wait too long between pulls may give the fish too much time to recuperate or escape. Most of the time it is sufficient to pull the hooked fish nearby so that it can be drawn from the water. Other times, it requires a fishing net to scoop the fish.

Landing nets, in general, are convenient devices for netting animals and objects. They usually include an elongated pole or handle with a net threaded through a circular rail on one end of the handle. While convenient for fishing, they can be difficult to employ in a situation where both hands are occupied in keeping the fish on the line or keeping the fishing pole braced. In a wet environment where the fish is struggling hard, the landing net can potentially slip from a user's hand. The net can also be relatively bulky making it cumbersome to stow.

Some solutions have been proposed that include collapsible netting. However, this involves a linkage system that can potentially snag and entangle the netting. Others involve a pivotal netting assembly attached to the end of a pole such that the netting can be folded over the pole. This permits ease of storage, but the netting assembly cannot be folded to reduce the overall form. Thus, it would be a benefit in the art to provide a manual landing net that can be stably employed in a wide variety of situations and capable of reducing its form factor for easy storage.

Thus, a collapsible landing net solving the aforementioned problems is desired.

SUMMARY OF THE INVENTION

The collapsible landing net includes a substantially elongate pole having an arm stabilizer at one end and a main hinge disposed on the opposite end. An intermediate hand grip portion defines a handle with a grip thereon. A collapsible net assembly is operatively attached to a pivot block on the main hinge to selectively fold the collapsible landing net. The collapsible net assembly includes a pair of curvilinear net rims threaded through a hook free net. The net rims are pivotal about a common point at one end of each net rim, while the other end of each net rim is connected to the pivot block. The collapsible net assembly may be collapsed by selectively rotating the net rims into a folded position and locked via locking grooves formed on the pivot block.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
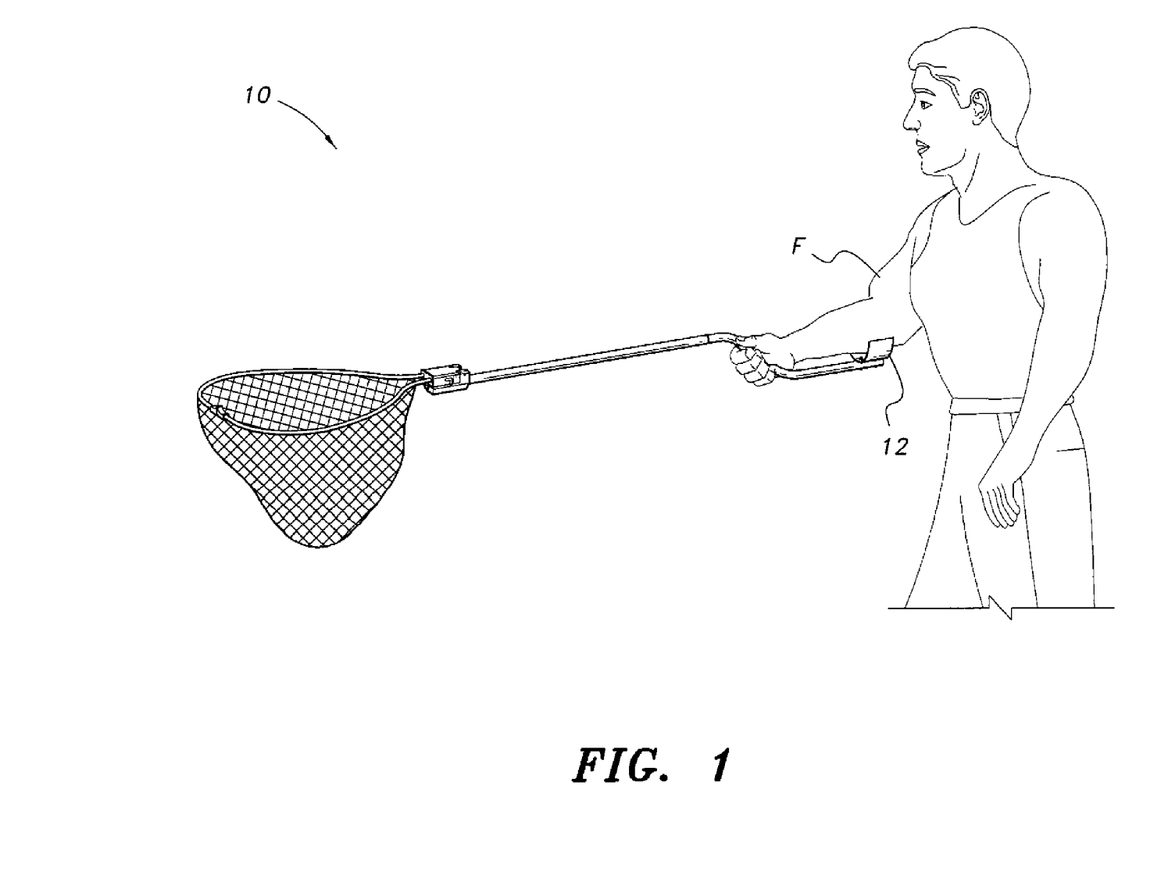
FIG. 1 is an environmental, perspective view of a collapsible landing net according to the present invention.
Figure 2:
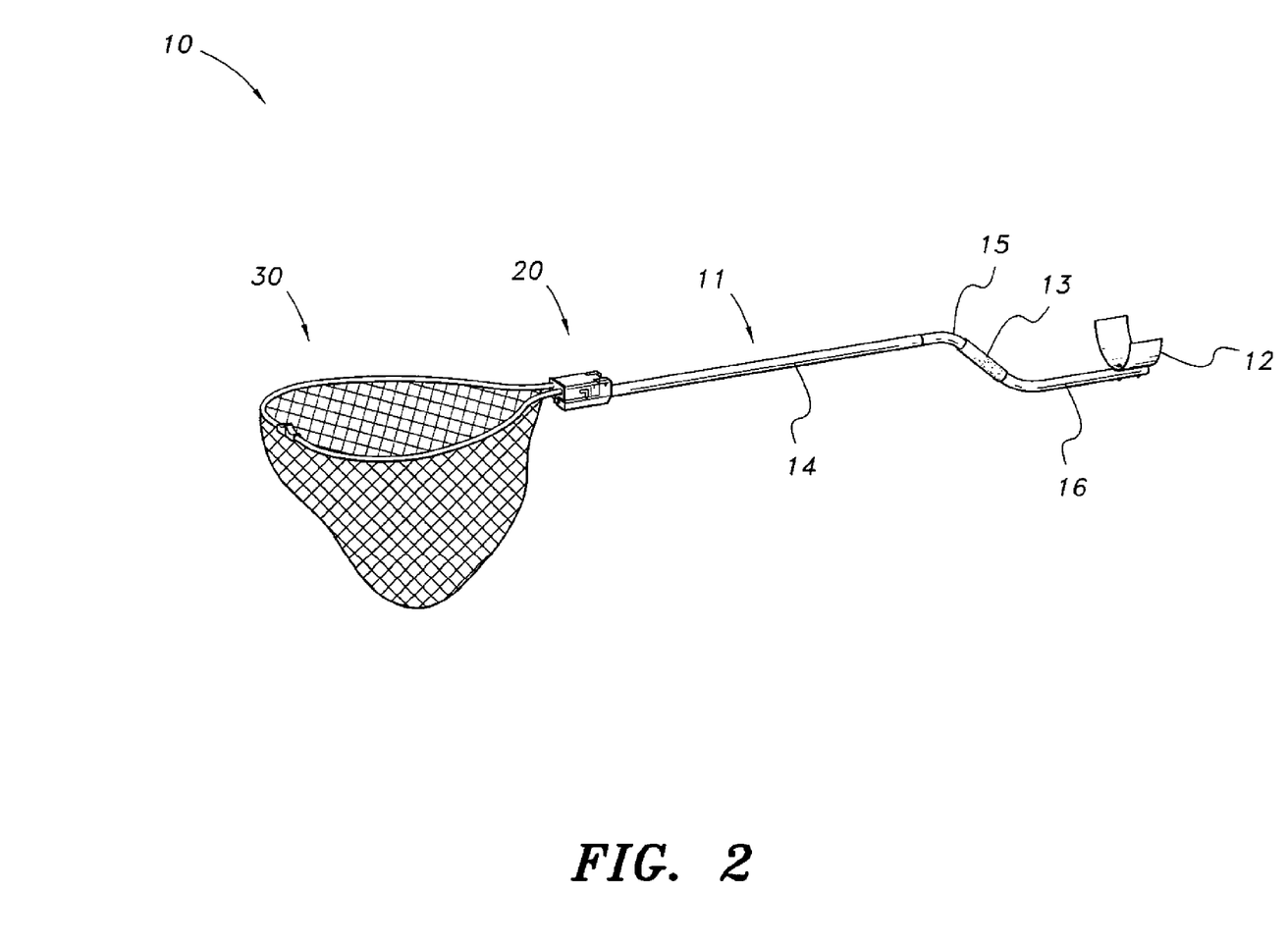
FIG. 2 is a perspective view of the collapsible landing net of FIG. 1.
Figure 3:
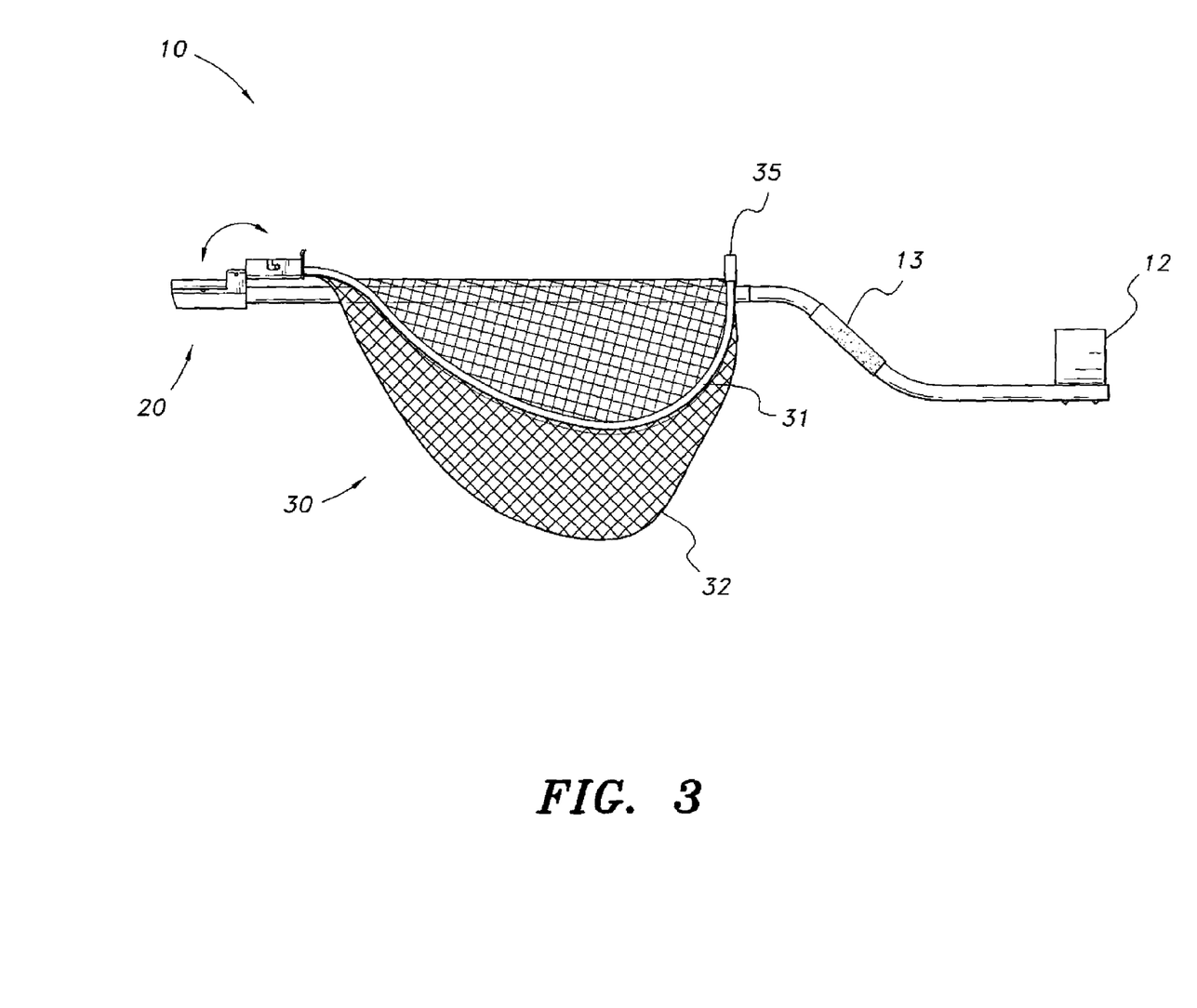
FIG. 3 is a side view of the collapsible landing net of FIG. 1 in a collapsed position.

The present invention relates to a collapsible landing net, generally referred to by reference number 10, having features for stable operation of the landing net and easy transport and storage. As shown in FIGS. 1-3, the collapsible landing net 10 includes an elongate leverage pole 11 connected at one end to one side of a main hinge 20. A collapsible net assembly 30 is operatively attached to the other side of the main hinge 20. The main hinge 20 facilitates folding of the collapsible net assembly 30 over the leverage pole 10, resulting in a small form factor, as depicted in FIG. 3.

The leverage pole 11 is a tubular pole having a main section 14, an intermediate bent (i.e., bent at an oblique angle) or bend section 15 and a distal end or section 16. The main section 14 defines the predetermined extension of the collapsible landing net 10. Although the drawings show the main section 14 as a straight elongate tube, a telescoping main section is a viable alternative to provide adjustable extension of the pole 11 as desired by the user.

The bent section 15 defines an ergonomic handle 13 to be grasped by the user. The handle 13 may include an ergonomic and/or friction-enhancing grip. Alternative ergonomic grip and handle configurations may also be used.

The distal end 16 includes an arm stabilizer 12 adapted to brace the collapsible landing net 10 against the user's forearm F. The arm stabilizer 12 may be a substantially U-shaped bracket attached to the distal end 16. The U-shaped bracket defines a pocket or cradle where the back of the user's forearm F may fit such that when the collapsible landing net 10 is properly held, the arm stabilizer 12 counterbalances the leverage forces from the opposite end. The upstanding walls of the U-shaped bracket also help to prevent undesirable twisting of the collapsible landing net 10 about the longitudinal axis thereof. Note that with the above configuration, the leverage pole 11 conforms to a more natural disposition of the user's arm for gripping an object. See e.g., FIG. 1.

Figure 4:
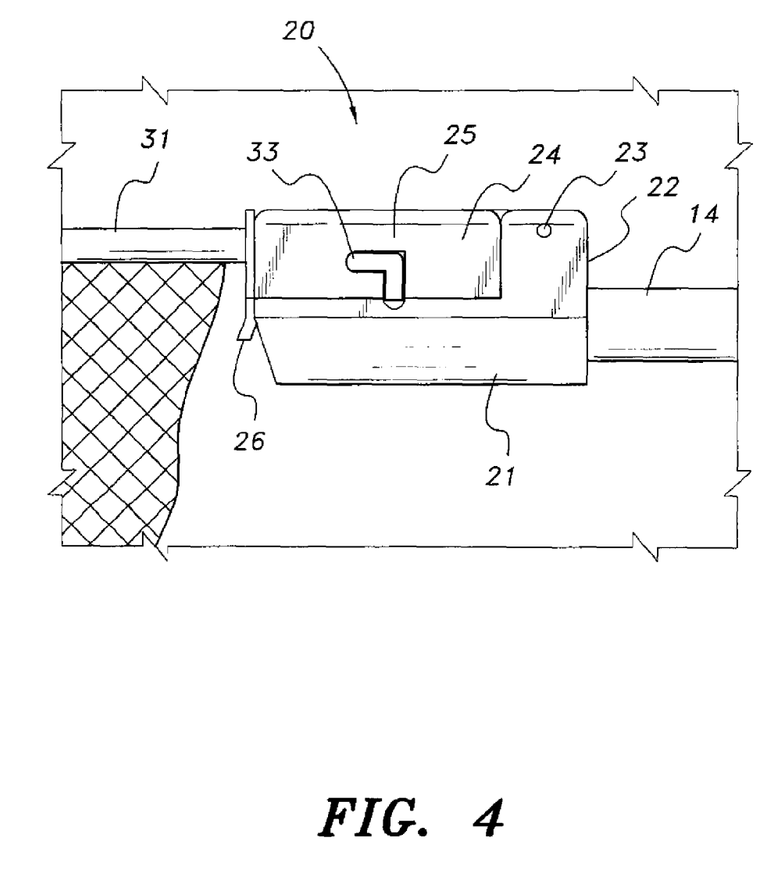
FIG. 4 is a partial side view of the collapsible landing net of FIG. 1, showing details of the main hinge.
Figure 5:
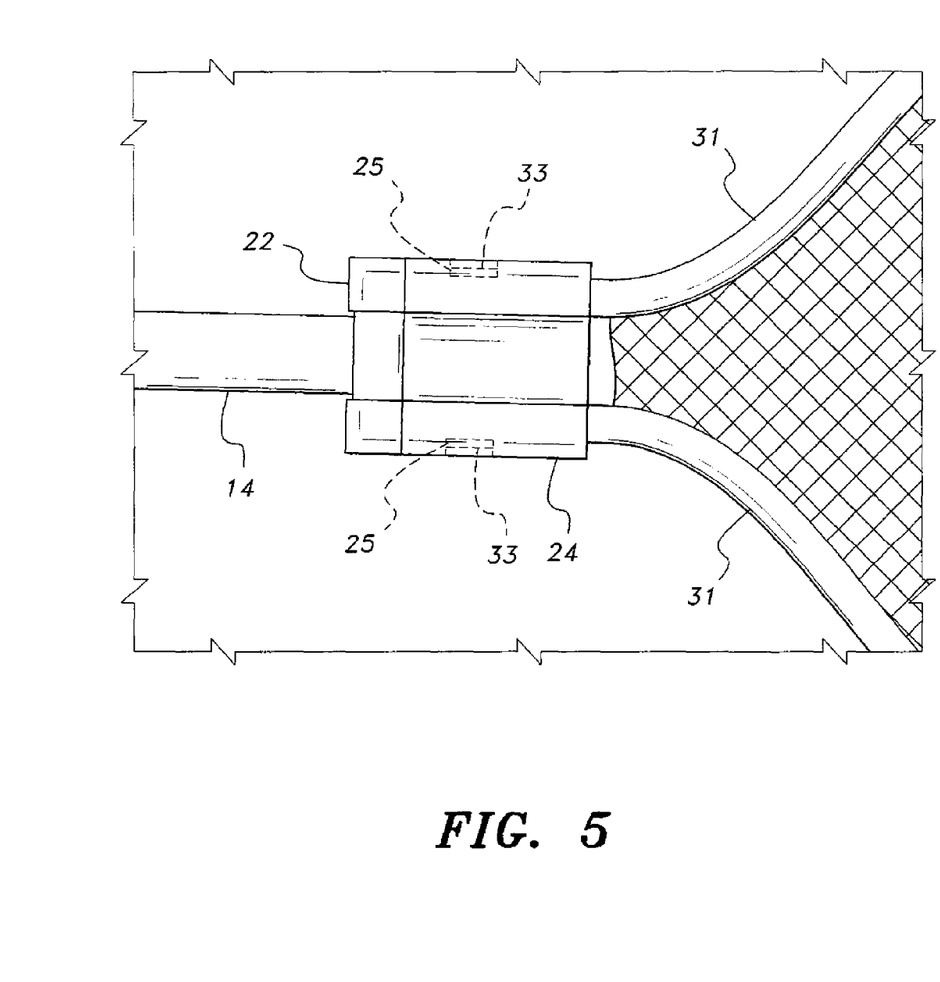
FIG. 5 is a partial top view of the collapsible landing net of FIG. 1, showing details of the main hinge.

Referring to FIGS. 4 and 5, the main hinge 20 includes an L-shaped lower base, block, section or bracket 21, as seen from the side, and a pivotal upper block, section or bracket 24. The lower base 21 is mounted to the main section 11 at one side of the main hinge 20. The lower base 21 includes an upstanding section 22 defining the L-shape, which forms a recess for the upper block 24. The upstanding section 22 of the lower base 21 houses a pivot pin 23 about which the upper block 24 may pivot. The upper block 24 may be a substantially rectangular block seated in the recess of the lower block 21 when the collapsible landing net 10 is in an extended position. Note FIGS. 1 and 2. The upper portion of the pivotal upper block 24 also includes locking grooves 25, the details of which will be discussed below.

The collapsible net assembly 30 is adapted to be mounted to the upper block 24 on the other side of the main hinge 20. The collapsible net assembly 30 includes a pair of curvilinear net rims, rails or prongs 31, 31 threaded through a hook-free net or netting 32. The net rails 31 define the shape of the net 32 as a loop when in an open or un-collapsed position as shown in FIGS. 1 and 2.

Figure 6:
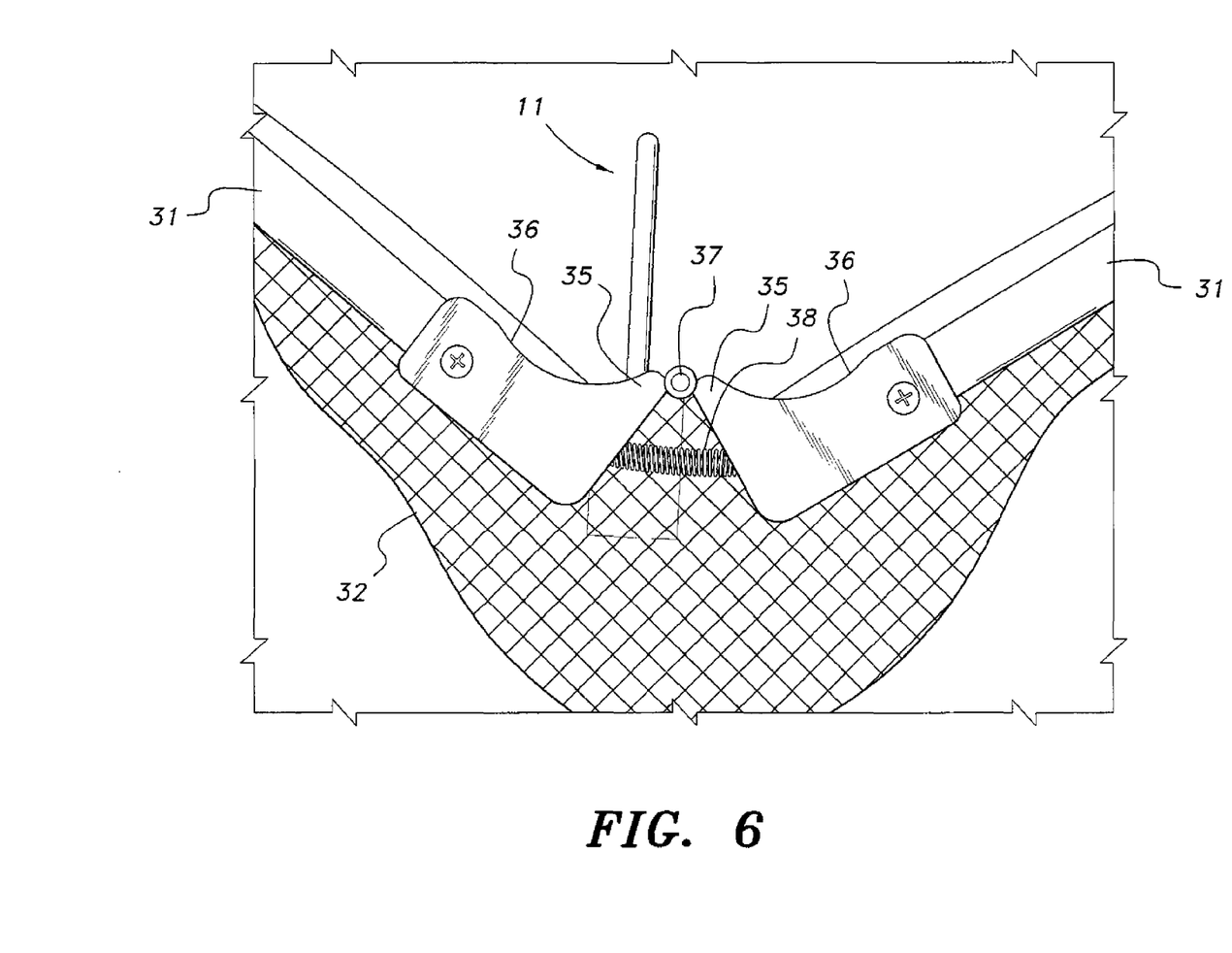
FIG. 6 is a partial front view of the collapsible landing net of FIG. 1, shown in a partially collapsed position.

To facilitate collapsing of the collapsible net assembly 30, the net rails 31 are pivotally attached to each other via a front hinge 35. As shown in FIG. 6, the front hinge 35 includes two pivotal blocks attached to distal ends of respective net rails 31, 31. The front hinge 35 is pivotal about a common pivot 37. Each front hinge block 35, 35 includes a curvilinear recess 36 adapted to conform to and wrap around the main section 14 when the collapsible net assembly 30 is folded over the main section 14 with the net rails 31, 31 rotated to the closed or collapsed position, as shown in FIG. 3. A tension spring 38 or other suitable mechanical biasing device is disposed between the front hinge blocks 35, 35 to bias the net rails 31, 31 in the open position.

The distal ends of the net rails 31, 31 are insertably mounted to the upper block 24. Each distal end has a locking pin 33 riding inside a respective locking groove 25. Each locking groove 25 is an L-shaped groove spanning a respective corner of the upper block 24. The extreme ends of the locking groove 25 correspond to the possible locking positions of the net rims 31, 31. For example, as shown in FIGS. 2, 4 and 5, the net rims 31 are in the open or non-collapsed position where the locking pins 33 are disposed in the lowermost extreme end of the locking groove 25. A resilient tab 26 disposed on the upper block 24 prevents the upper block 24 from pivoting with respect to the lower block 21 when the collapsible net assembly 30 is in the extended or unfolded position. Locking pins 33 and locking groove 25 are exemplary only, and it should be understood that any other hinge locking mechanism known in the art may be used in lieu of the locking pin 33 and groove 25.

With reference to FIGS. 5 and 6, when it is desired to collapse the collapsible net assembly 30, the net rims 31 are rotated toward each other about pivot 37, causing the locking pins 33 to ride down in the locking grooves 25. Once collapsed, the net rims 31, 31 are pushed towards the other extreme end of the locking grooves 25 where the locking pins 33 are prevented from rotating back into the open position of the net rims 31, 31 due to the tension spring 38. To open the collapsible net assembly 30, the process is reversed so that the locking pins 33 end at the lowermost extreme end of the locking grooves 25.

To prepare the collapsible landing net 10 for transport or storage, the collapsible landing net 10 may be folded and collapsed into the smaller form shown in FIG. 3. To facilitate this, the latch 26 is released to allow pivoting of the upper block 24 towards the main section 14 to fold the collapsible landing net 10. Once positioned, the net rims 31, 31 are rotated so that the front hinge 35 wraps around the main section 14, collapsing the net 32. This concurrently causes the locking pins 33 to move away from the current extreme end of the locking groove 25. The net rims 31, 31 are then pulled so that the locking pins 33 ride toward the other extreme end of the locking groove 25, and are thereby maintained in the collapsed position. Now the collapsible landing net 10 is ready for transport and storage.

The embodiments illustrated in the drawings show the mechanism for locking the net assembly folded against the pole for storage as locking pins 33 extending from the net rims 31 that rotate and slide in cooperating L-shaped grooves 25 defined in the upper block 24 of the main hinge 20. However, the collapsible landing net 10 may use alternative locking mechanisms for the same purpose. For example, the portion of the main section 14 of the leverage pole 11 adjacent the bent section 15 may have a resilient clamp or clasp attached thereto that the net assembly snaps into to lock the net assembly into the closed position for storage.

Figure 7:
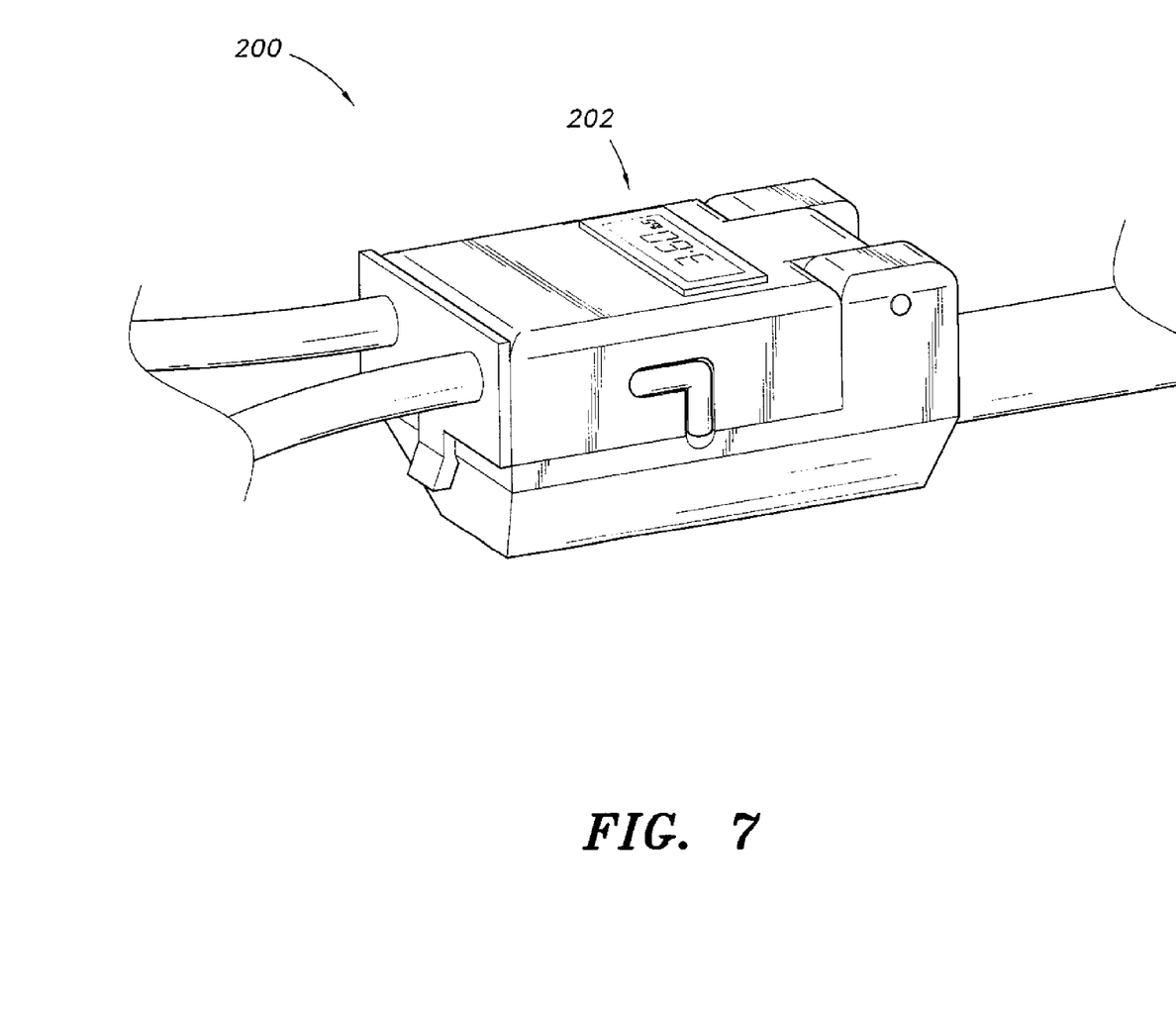
FIG. 7 is a perspective view of an alternate embodiment of the main hinge for the collapsible landing net.

It is noted that the collapsible landing net 10 encompasses a wide variety of alternatives. For example, the collapsible landing net 10 may be made from aluminum, other metals, plastic, wood, composites or a combination thereof for lightweight and durability. Instead of tubular, the leverage pole 11 may be formed from solid poles within reasonable weight. The arm stabilizer 12 may include a strap for a more secure attachment to the forearm F. Moreover, as shown in alternative embodiment 200, the main hinge may include an electronic scale and digital readout 202 to measure one's catch. Additional sections of the leverage pole 11 may be covered with friction enhancing ergonomic grips. The distal end 16 may include an adjustable strap and/or belt hook for carrying the collapsible landing net 10. Furthermore, the collapsible landing net 10 may be colored and/or include indicia for advertising or personal recognition.

It is to be understood that the present invention is not limited to the embodiments described above, but encompasses any and all embodiments within the scope of the following claims.

We claim:

1. A collapsible landing net, comprising:
   a substantially elongated leverage pole having a main section, a hand grip section, and a distal section, the hand grip section being disposed between the main section and the distal section;
   an arm cradle disposed on the distal section;
   a handle disposed on the hand grip section, the handle being adapted for gripping by a user
   a main hinge assembly having opposite ends, the assembly having one of the opposite attached to the main section of the leverage pole; wherein the main hinge assembly comprises:
      an L-shaped lower block attached to the main section of said leverage pole;
      an upper block having L-shaped grooves defined in opposite sides thereof; and
      a hinge pin connecting the lower block and the upper block; and
   a collapsible net assembly attached to another of the opposite ends of the main hinge assembly opposite the leverage pole, the collapsible net assembly having a net attached thereon, the collapsible net assembly selectively collapsing and opening the net, the upper block attached to said collapsible net assembly, wherein the collapsible net assembly comprises:
      a pair of curvillnear net rims, the net being attached to the net rims; and
      a front hinge connecting the net rims defining a loop when said net assembly is pivoted open the net;
      the net rims having locking pins extending therefrom, the locking pins being rotable and slidable in the L-shaped grooves defined in said upper block; and
      a resilient tab attached to said upper block, the tab bearing against said lower block when said net assembly is extended away from the leverage pole to open the net, the locking pins, the L-shaped grooves, and the resilient tab defining a locking mechanism for locking said collapsible net assembly in a folded position against the leverage pole for compact storage and transport, and for locking the collapsible net assembly in a position extending from the leverage pole for opening the net;

wherein the main hinge assembly is pivotal between an open position in which the net assembly extends away from the leverage pole to open the net, and a collapsed position in which the net assembly is folded against the leverage pole for compact storage and transport in the folded position.

2. The collapsible landing net according to claim 1, wherein the hand grip section of said leverage pole comprises a section of the pole bent at an oblique angle to the distal section, whereby the main section and the distal section are offset from one another.

3. The collapsible landing net according to claim 1, further comprising a grip made from material having a high coefficient of friction disposed around the hand grip section of said leverage pole.

4. The collapsible landing net according to claim 1, wherein said front hinge comprises:
   a pair of blocks attached to said net rims;
   an other hinge pin connecting the blocks attached to said net rims; and
   means for biasing the net assembly to open the net.

5. The collapsible landing net according to claim 4, wherein said means for biasing comprises a spring extending between the blocks attached to said net rims.

\* \* \* \* \*